United States Patent
Hilmann et al.

(10) Patent No.: US 10,118,646 B2
(45) Date of Patent: Nov. 6, 2018

(54) CHASSIS-SUBFRAME ARRANGEMENT FOR IMPROVING CRASH PROTECTION

(71) Applicant: FORD GLOBAL TECHNOLOGIES, LLC, Dearborn, MI (US)

(72) Inventors: Joergen Hilmann, Leverkusen (DE);
Martin Salz-Breuer, Bonn (DE);
Bradley Staines, Bishops Stortford (GB); Stephen Anker, Woodbridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/407,986

(22) Filed: Jan. 17, 2017

(65) Prior Publication Data
US 2017/0203791 A1    Jul. 20, 2017

(30) Foreign Application Priority Data
Jan. 18, 2016  (DE) .................. 10 2016 200 518

(51) Int. Cl.
*B62D 21/15* (2006.01)
*B62D 21/09* (2006.01)
(Continued)

(52) U.S. Cl.
CPC .......... *B62D 21/155* (2013.01); *B62D 21/09* (2013.01); *B62D 21/10* (2013.01); *B62D 29/007* (2013.01); *H05K 999/99* (2013.01)

(58) Field of Classification Search
CPC ...... B62D 21/155; B62D 21/09; B62D 21/10; B62D 29/007
(Continued)

(56) References Cited

U.S. PATENT DOCUMENTS 5,884,963 A    3/1999  Esposito et al.
6,029,765 A *  2/2000  Chou ............... B60K 5/1216
                                                        180/292
(Continued)

FOREIGN PATENT DOCUMENTS

DE     3701723 A1    8/1988
DE    19547491 C1    3/1997
(Continued)

OTHER PUBLICATIONS

Machine translation of DE'556 (Year: 2012).*
(Continued)

*Primary Examiner* — Hilary L Gutman
(74) *Attorney, Agent, or Firm* — Frank A. MacKenzie; Brooks Kushman P.C.

(57) ABSTRACT

A chassis-subframe is attached to a vehicle body and is connected via a plurality of fasteners to high load-bearing body parts. The chassis subframe is connected to the load-bearing body parts by the fasteners indirectly via a sacrificial plate. From a specific relative force acting substantially in the vehicle longitudinal direction between the chassis subframe and the sacrificial plate, the fasteners are pulled out of said sacrificial plate, immediately in the case of a displacement movement of the chassis subframe occurring to the rear, viewed in the vehicle longitudinal direction. The fasteners are arranged by the sacrificial plate relative to the load-bearing body parts such that, after being pulled out, the fasteners are able to move freely to the rear in the vehicle longitudinal direction, without interacting with the, or another of the, load-bearing body parts.

6 Claims, 5 Drawing Sheets

(51) Int. Cl.
  *B62D 21/10* (2006.01)
  *B62D 29/00* (2006.01)

(58) Field of Classification Search
  USPC .......................................................... 296/214
  See application file for complete search history.

(56) References Cited

U.S. PATENT DOCUMENTS

| | | | |
|---|---|---|---|
| 6,367,869 B1 * | 4/2002 | Baccouche | B62D 21/155 280/784 |
| 8,646,792 B2 | 2/2014 | Young et al. | |
| 2001/0011833 A1 * | 8/2001 | Artner | B62D 21/152 296/187.03 |
| 2007/0212193 A1 * | 9/2007 | Wang | F16B 37/061 411/171 |
| 2013/0119705 A1 * | 5/2013 | Matuschek | B62D 21/152 296/187.03 |
| 2014/0352388 A1 * | 12/2014 | Balint | C21D 1/62 72/342.5 |
| 2015/0061272 A1 | 3/2015 | Watanabe et al. | |

FOREIGN PATENT DOCUMENTS

| | | |
|---|---|---|
| DE | 19830026 A1 | 1/2000 |
| DE | 102006002750 A1 | 9/2007 |
| DE | 102006048529 A1 | 4/2008 |
| DE | 102011009120 A1 | 8/2011 |
| DE | 102011111712 A1 | 5/2012 |
| DE | 102011122556 B3 | 11/2012 |
| EP | 1510444 A1 | 8/2003 |
| EP | 2017163 A2 | 1/2009 |
| JP | 2006240325 A | 9/2006 |
| WO | WO-2007141152 A1 * 12/2007 ............... C21D 1/18 |

OTHER PUBLICATIONS

Google translation of DE'556 paragraph 0024 (Year: 2012).*
Google translation of DE'556 paragraph 0025 (Year: 2015).*
Google translation of German search report dated (Year: 2016).*
Google translation of EP search report dated (Year: 2016).*
EP Search Report dated May 16, 2017 for EP Application No. 17150827.
German Search Report dated Sep. 8, 2016 for German Application No. 102016200518.9, 7 pgs.

* cited by examiner

CHASSIS-SUBFRAME ARRANGEMENT FOR IMPROVING CRASH PROTECTION

CROSS-REFERENCE TO RELATED APPLICATIONS

This application claims foreign priority benefits under 35 U.S.C. § 119(a)-(d) to DE 10 2016 200 518.9 filed Jan. 18, 2016, which is hereby incorporated by reference in its entirety.

TECHNICAL FIELD

The present disclosure relates to a chassis-subframe arrangement for a vehicle on a preferably self-supporting vehicle body for improving crash protection.

BACKGROUND

Modern vehicle bodies are provided with a very rigid chassis-subframe in the region of the front wheel suspension, whereby the absorption of transverse forces and thus the directional stability of the vehicle is improved. Moreover, in this design the entire drive train, including the front wheel suspension, is able to be fitted in a manner that is advantageous in terms of production technology as a complete assembly module into the vehicle body during the vehicle assembly.

However, this design results in problems relative to the crash protection of the vehicle occupants. Thus, for the protection of the vehicle occupants, in particular in the case of a front impact of the vehicle, a number of measures are known from the prior art in which the kinetic energy of the vehicle is converted into deformation energy by the plastic deformation of body parts, and too great an acceleration of the occupants is intended to be prevented thereby. When fitting a chassis-subframe, however, the rigidity thereof, which is actually desired to improve the directional stability, prevents the deformation zones of the body in the region of the subframe from being able to deform sufficiently.

EP 1 510 444 B1 discloses, for example, a chassis-subframe arrangement for improving the crash protection for vehicles, in which a chassis-subframe that is fastened directly to load-bearing body parts is detached from the body parts and displaced to the rear in the event of a front impact of the vehicle. In this case, at its rear suspension points viewed in the vehicle longitudinal direction, the subframe is pushed below the passenger compartment by a ramp formed by the load-bearing body parts. At its rear suspension points the subframe is indirectly connected to the load-bearing body parts via a fastening plate weakened by longitudinal forces, said fastening plate being correspondingly deformed in the case of a displacement movement of the subframe directed to the rear.

Moreover, a front part structure of a vehicle body with a chassis-subframe is disclosed in EP 2 017 163 B1, said front part structure being connected at rear suspension points via fastening means directly to the vehicle body. In the event of a front impact of the vehicle, the subframe is detached from the vehicle body at its rear suspension points.

U.S. Pat. No. 5,884,963 discloses a body structure element which, in the event of a front impact of the vehicle, converts kinetic energy by the deformation thereof and by further deformation conducts a chassis-subframe below the passenger compartment.

U.S. Pat. No. 8,646,792 B2 discloses a vehicle frame structure with a chassis-subframe, an absorption surface interacting therewith in the case of a displacement movement of the subframe as a result of a front impact of the vehicle, in order to convert kinetic impact energy by additional deformation work.

For improving the crash protection, accordingly it is generally provided that in the event of a front impact of the vehicle, from a specific degree of deformation of the body parts, the chassis-subframe is detached from the vehicle structure and is pushed to the rear below the vehicle structure relative to the vehicle longitudinal direction. In this case, the fastening means, for example mounting bolts, with which the chassis-subframe is usually fastened to high load-bearing parts of the vehicle body, either pull out of or shear off the load-bearing body parts. By the current intensive use of, for example, boron steels, which have the characteristic of being brittle, for producing the high load-bearing body parts, there is the risk of the load-bearing body parts being cracked or even ruptured, however, when in the event of a front impact of the vehicle, the fastening means of the chassis-subframe is pulled out of the body part. This, however, results in significant weakening of the load-bearing body parts and thus of the deformation zones of the vehicle. Moreover, after the detachment of the subframe and its displacement below the vehicle body, there is also the risk that the pulled-out fastening means, for example the screw bolts, in the course of their displacement interact with other load-bearing body parts, for example by becoming caught thereon, whereby the load-bearing body parts are also able to be damaged by the aforementioned effect and thus weakened.

SUMMARY

In view of this background, the object of the present disclosure is to provide a chassis-subframe arrangement for vehicles that, in the event of a front impact of the vehicle, permits an effective deformation of the deformation zones of the vehicle body without being hampered by a chassis-subframe.

It should be mentioned that the features set forth individually in the claims may be combined together in any technically expedient manner and disclose further embodiments of the disclosure. The description characterizes and specifies the disclosure, in particular additionally in combination with the figures.

According to the disclosure, a chassis-subframe arrangement for a vehicle, in particular a motor vehicle, on a preferably self-supporting vehicle body for improving crash protection, comprises a chassis-subframe, which is attached to the vehicle body and is connected via a fastening means to high load-bearing body parts. The chassis-subframe is connected to the load-bearing body parts by at least one fastening means indirectly via a sacrificial plate. It is to be understood thereby that the chassis-subframe is preferably directly connected by the fastening means to the sacrificial plate, which in turn is also preferably connected directly to the load-bearing body parts. According to the disclosure, the sacrificial plate is designed such that, from a specific relative force acting substantially in the vehicle longitudinal direction between the chassis-subframe and the sacrificial plate, the fastening means is pulled out of said sacrificial plate, immediately in the case of a displacement movement of the chassis-subframe occurring to the rear, viewed in the vehicle longitudinal direction, wherein the fastening means connected to the sacrificial plate is arranged by means of the sacrificial plate relative to the load-bearing body parts such that, after being pulled out, the fastening means is able to move freely to the rear in the vehicle longitudinal direction without interacting with the, or other, load-bearing body parts, for example by becoming caught thereon. In this manner, it is ensured that in the event of a front impact the deformation zones of the vehicle body are able to deform unhampered by the chassis-subframe, since in the event of a front impact, on the one hand, the subframe may be displaced unhindered to the rear in the vehicle longitudinal direction and, on the other hand, at the same time no load-bearing body parts are damaged.

One advantageous embodiment of the disclosure provides that the at least one fastening means is connected to the sacrificial plate at a first fastening position, furthest to the front viewed in the vehicle longitudinal direction, and the sacrificial plate is connected to the load-bearing body parts at a second fastening position, furthest to the front viewed in the vehicle longitudinal direction. In this case it should be understood that the sacrificial plate may also be connected as a whole at a plurality of fastening positions and/or fastening points to the load-bearing body parts, for example in a linear or planar manner, wherein however at least one fastening position is characterized as a fastening position furthest to the front, viewed in the vehicle longitudinal direction. It represents the fastening point of the sacrificial plate on the load-bearing body part furthest to the front, viewed in the vehicle longitudinal direction.

Moreover, in this embodiment, it is provided that the first fastening position furthest to the front, viewed in the vehicle longitudinal direction, is arranged behind the second fastening position furthest to the front. This ensures that the fastening means, immediately when the longitudinal displacement of the chassis-subframe occurs, starts to pull out of the sacrificial plate without interacting in a damaging manner with the load-bearing body parts, to which the sacrificial plate is connected, for example by the fastening means becoming caught on a load-bearing body part, and thus releases the subframe at this fastening position on the sacrificial plate side. In this case, the tearing operation may advantageously be used for converting kinetic impact energy.

Preferably, according to a further advantageous embodiment of the disclosure, the sacrificial plate is weakened in a defined manner by structural means relative to longitudinal forces acting in the vehicle longitudinal direction, in order to ensure that the fastening means is pulled out of the sacrificial plate. For example, the defined weakened portion of the sacrificial plate may be designed as at least one bore, so that from a specific longitudinal force loading acting in the vehicle longitudinal direction the at least one fastening means, which is connected to the sacrificial plate, is pulled out of the sacrificial plate to the rear. Similarly, the sacrificial plate may also be weakened, for example, in terms of the thickness thereof at corresponding points.

A further advantageous embodiment of the disclosure provides that the sacrificial plate is produced from a material, in particular a steel having lower strength than the material of the load-bearing body parts. This property also ensures that with a sufficient relative force between the chassis-subframe and the sacrificial plate, the fastening means connected to the sacrificial plate is able to be pulled out of said sacrificial plate. On the other hand, for example, via a correspondingly selected thickness of the sacrificial plate, a fatigue strength of the connection of the chassis-subframe on the load-bearing body parts, which is sufficient for the operation of the vehicle, may also be ensured.

For achieving a high degree of stiffness of the vehicle body and the ability for transmitting high loads, the high load-bearing body parts may be produced at least partially from a boron steel. Although such steels are usually relatively brittle, by means of the chassis-subframe arrangement according to the disclosure by using the sacrificial plate for attaching the chassis-subframe to the load-bearing body parts, there is no risk of damage to the load-bearing body parts by the fastening means being pulled out of the sacrificial plate in the event of a front impact of the vehicle. According to the disclosure, the boron steel may be replaced by any other suitable steel with similar properties, for example by two-phase steels.

According to a further advantageous embodiment of the disclosure, the fastening means connected to the sacrificial plate in a second plane spaced apart from the fastening plane on the sacrificial plate is substantially supported in the vehicle longitudinal direction by a support component connected to the vehicle body. This support component, for example a support plate, permits the additional absorption of forces acting in the vehicle longitudinal direction, as may occur during normal operation of the vehicle. Thus, the fatigue strength of the connection of the chassis-subframe to the load-bearing body parts may be improved. The support component, on the other hand, is designed such that it does not substantially counteract a displacement movement of the chassis-subframe as a result of a front impact of the vehicle, for example preferably by being deformed by the displacement movement of the chassis-subframe. The support component additionally functions as torque assistance of the fastening means, the chassis-subframe being attached thereby to the sacrificial plate.

In a preferred embodiment, the fastening means connected to the sacrificial plate is a screw bolt screwed to a weld nut welded to the sacrificial plate. However, other suitable nuts are also conceivable, for example rivet nuts, or dome nuts.

Since in the event of a front impact of the vehicle the chassis-subframe in the above-described manner does not negatively impair a deformation of the deformation zones of the vehicle body, for improving the directional stability of the vehicle the chassis-subframe, may be configured as a flexurally stiff and torsionally stiff chassis element.

Further features and advantages of the disclosure are disclosed in the following description of an exemplary embodiment of the disclosure which is not to be understood as limiting and which is described hereinafter in more detail with reference to the drawings. In these drawings, schematically:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various figures, parts which are the same with regard to their function are always provided with the same reference numerals, so that generally they are only described once.

Figure 1:
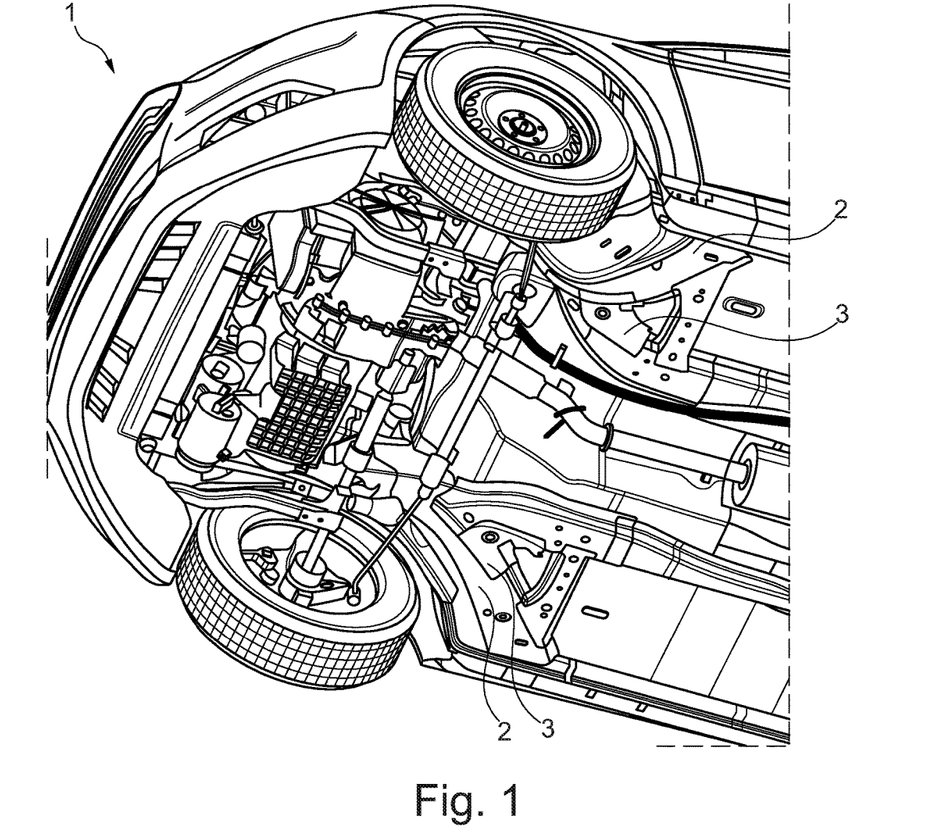
FIG. 1 shows a perspective partial view of a front part of a vehicle from below.

FIG. 1 shows a perspective, partial view of a front part of a vehicle 1 obliquely from below. The vehicle 1 comprises a chassis-subframe arrangement according to the disclosure, shown only partially in FIG. 1. The vehicle 1 comprises a self-supporting vehicle body, only two high load-bearing body parts 2 thereof being specifically identified in FIG. 1. In FIG. 1, it may be further identified that in each case a sacrificial plate 3 is connected to the load-bearing body parts 2, the function thereof being described in more detail hereinafter.

Figure 2:
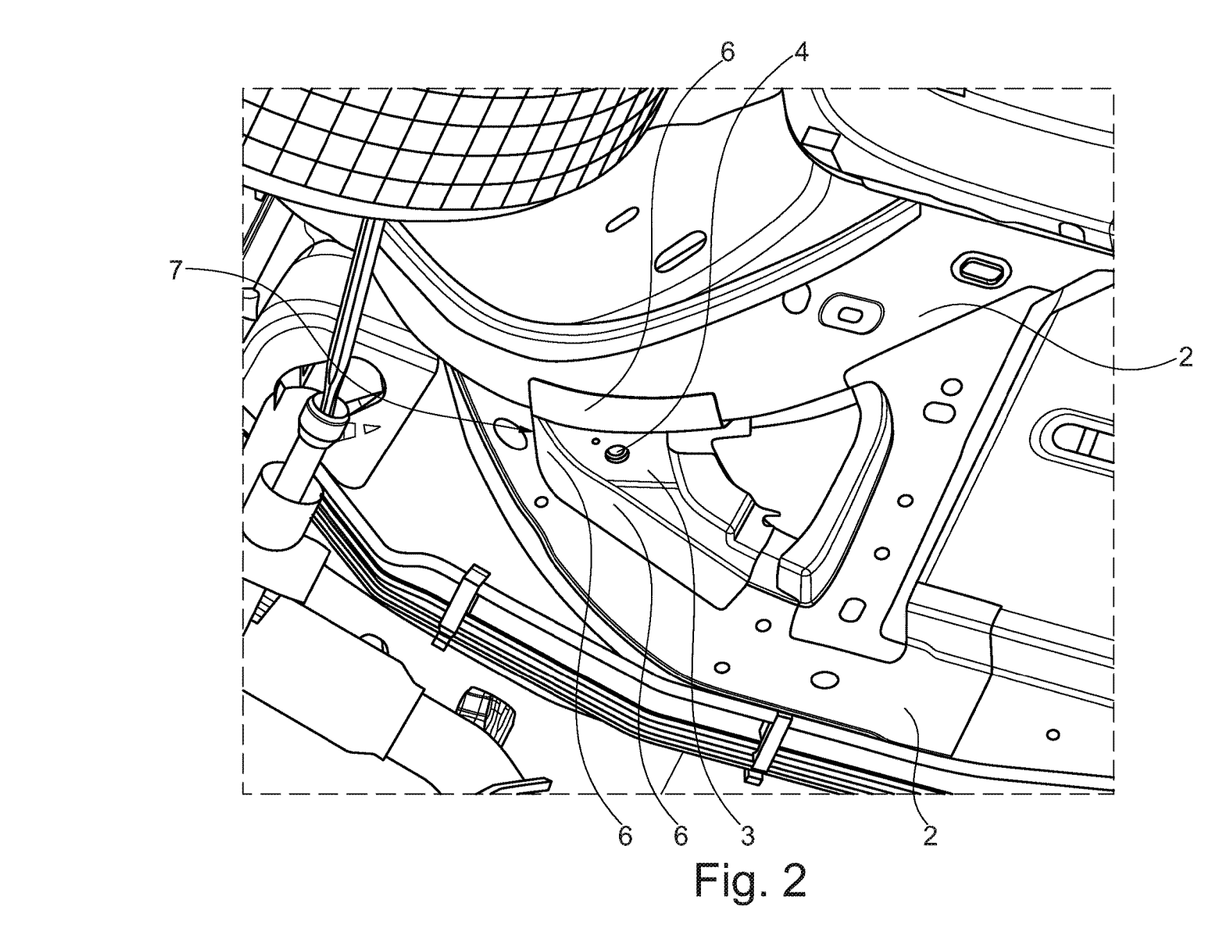
FIG. 2 shows an enlarged perspective detailed view of a region of the vehicle underside shown in FIG. 1.

FIG. 2 shows an enlarged-perspective, detailed view of a region of the vehicle underside of the vehicle 1 shown in FIG. 1. In particular, in FIG. 2, the region around the left-hand load-bearing body part 2 with the sacrificial plate 3 connected thereto is illustrated. In FIG. 2, a receiver opening 4 may be clearly identified, said receiver opening being configured in the sacrificial plate 3 and functioning as the first fastening position, in particular the first fastening position 4 furthest to the front, viewed in the vehicle longitudinal direction, for a fastening means 5 not shown in FIG. 2 (see for example FIG. 4). In the embodiment of the chassis-subframe arrangement shown in FIG. 2, the sacrificial plate 3 is fixedly connected to the load-bearing body part 2 via fastening flanges 6. A second fastening position of the sacrificial plate 3 furthest to the front relative to the vehicle longitudinal direction on the load-bearing body parts 2 is identified in FIG. 2 at 7.

Figure 3:
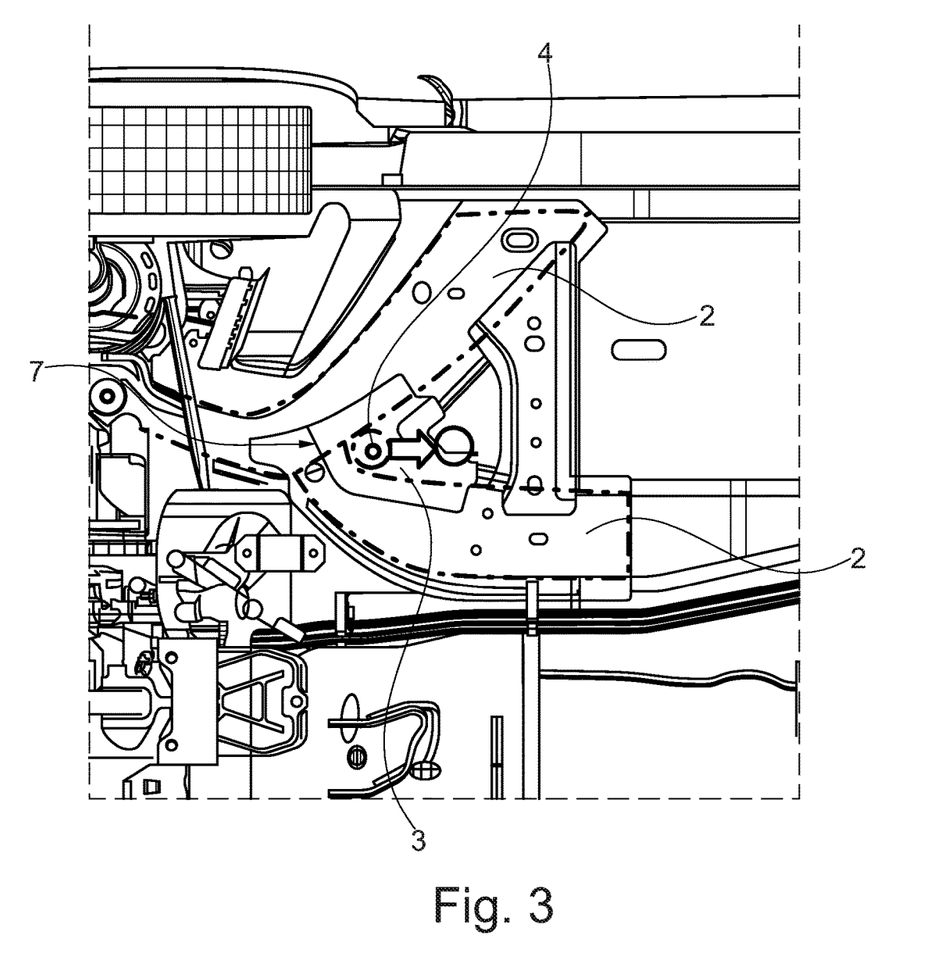
FIG. 3 shows a plan view of the detailed view shown in FIG. 2.

FIG. 3 shows a plan view of the detailed view shown in FIG. 2. In FIG. 3, the load-bearing body parts 2 in each case are highlighted by dashed-dotted contour lines. It may be clearly seen in FIG. 3 that the first fastening position 4 of the sacrificial plate 3 for the fastening means 5 (not shown), furthest to the front viewed in the vehicle longitudinal direction, is arranged to the rear of the second fastening position 7 of the sacrificial plate 3 furthest to the front on the load-bearing body parts 2. In particular, the fastening position 4 is also arranged to the rear of the position of the load-bearing body parts 2 where the two body parts 2 are connected together.

Figure 4:
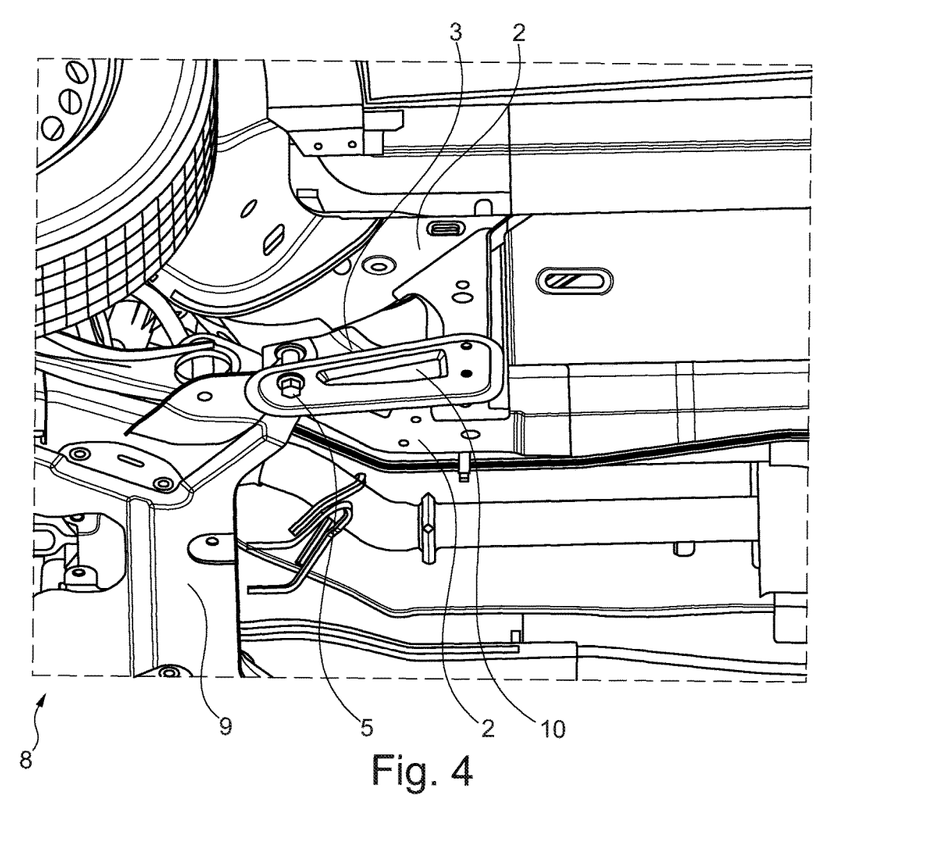
FIG. 4 shows a perspective partial view of a chassis-subframe arrangement according to the disclosure in a state of the vehicle ready for operation.

FIG. 4 shows a perspective partial view of a chassis-subframe arrangement 8 according to the disclosure in a state of the vehicle 1 ready for operation. The subframe arrangement 8 comprises a chassis-subframe 9 attached to the vehicle body, which is configured, in particular, as a flexurally stiff and torsionally stiff chassis element. In the partial view of FIG. 4, as viewed in FIGS. 2 and 3 in the direction of travel of the vehicle 1, only the left-hand region of the subframe arrangement 8 is illustrated. As may be identified in FIG. 4, the chassis-subframe 9 is connected by the fastening means 5 indirectly via the sacrificial plate 3 to the load-bearing body parts 2. The fastening means 5 connected to the sacrificial plate 3 in the embodiment shown of the chassis-subframe arrangement 8 is a screw bolt screwed to a weld nut welded to the sacrificial plate 3.

It is further revealed from FIG. 4 that, in the chassis-subframe arrangement 8 shown, the fastening means 5 connected to the sacrificial plate 3 is supported in a second plane spaced apart from the fastening plane of the fastening means 5 on the sacrificial plate 3, substantially in the vehicle longitudinal direction, by a support component 10 connected to the vehicle body and/or the load-bearing body parts 2, for example a support plate. This primarily serves to absorb forces acting in the vehicle longitudinal direction during operation of the vehicle, in addition to the fastening means 5 and the sacrificial plate 3, in order to improve further the fatigue strength of the connection of the chassis-subframe 9 to the load-bearing body parts 2. The support component 10 also acts as torque assistance of the fastening means 5.

Figure 5:
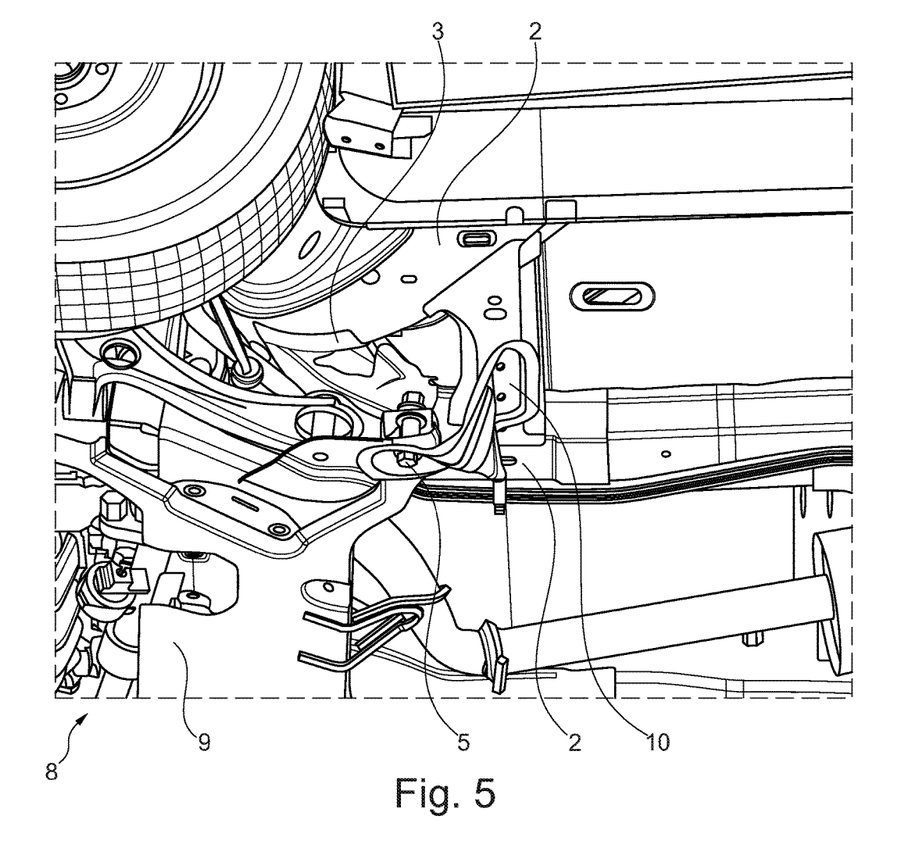
FIG. 5 shows the chassis-subframe arrangement of FIG. 4 after a front impact of the vehicle.

FIG. 5 shows the chassis-subframe arrangement 8 of FIG. 4 after a front impact of the vehicle 1 and the corresponding displacement of the chassis-subframe 9 in the vehicle longitudinal direction to the rear. As may be identified in FIG. 5, the sacrificial plate 3 of the chassis-subframe arrangement 8 is designed such that, from a specific relative force acting substantially in the vehicle longitudinal direction between the chassis-subframe 9 and the sacrificial plate 3, the fastening means 5 is pulled out of the sacrificial plate, immediately with a displacement movement of the chassis-subframe 9 occurring to the rear, viewed in the vehicle longitudinal direction. By the arrangement described herein of the sacrificial plate 3 on the load-bearing body parts 2 and by the geometric arrangement that is fixed thereby of the fastening means 5 relative to the load-bearing body parts 2, the fastening means 5, after being pulled out in the vehicle longitudinal direction, is able to move freely to the rear without interacting with body parts 2 or other load-bearing body parts, for example by becoming caught thereon and thereby damaging said body parts. As has already been described further above, to this end at the first fastening position 4 (see FIGS. 2 and 3) and/or the receiver opening 4 in the sacrificial plate 3, the fastening means 5 is connected to said sacrificial plate, wherein the sacrificial plate 3 is connected at the second fastening position 7 furthest to the front, viewed in the vehicle longitudinal direction, to the load-bearing body parts 2. Since the first fastening position 4 furthest to the front, viewed in the vehicle longitudinal direction, is arranged to the rear of the second fastening position 7 furthest to the front, immediately after the displacement movement of the chassis-subframe 9 occurring to the rear, viewed in the vehicle longitudinal direction, the fastening element 5 starts to be pulled out of the sacrificial plate 3, as a result of a front impact of the vehicle 1. This process is additionally promoted, in the exemplary embodiment shown of the chassis-subframe arrangement 8, by the sacrificial plate 3 being produced from a substantially more ductile steel than the load-bearing body parts 2, which are preferably produced from a boron steel.

As may be identified in FIG. 5, the support component 10 does not substantially limit the main function of the sacrificial plate 3, in the case of a front impact of the vehicle 1 and corresponding displacement of the chassis-subframe 9 in the vehicle longitudinal direction, which is to permit the fastening means 5 to be able to be pulled out to the rear. The support component 10 is simply deformed by the displacement movement of the chassis-subframe 9 to the rear.

The chassis-subframe arrangement according to the disclosure has been described in more detail with reference to an exemplary embodiment shown in the figures. The chassis-subframe arrangement, however, is not limited to the embodiment described herein but also encompasses further embodiments having the same function. Thus, for example, it is also conceivable to use the chassis-subframe arrangement according to the disclosure in a similar manner on the rear of a vehicle for improving crash protection in the event of a rear impact.

In a preferred embodiment, the chassis-subframe arrangement according to the disclosure is used in a motor vehicle.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A subframe arrangement for a vehicle comprising:
   a sacrificial plate that indirectly connects, via a fastener, a subframe and high load-bearing body parts,
   wherein the fastener is pulled from the sacrificial plate during subframe displacement occurring to a rear along a longitudinal direction due to a force acting in the longitudinal direction between the subframe and the sacrificial plate such that, after being pulled from the sacrificial plate, the fastener moves toward the rear in the longitudinal direction, without interacting with the, or another of the load-bearing body parts, and
   wherein the fastener is connected to the sacrificial plate at a first fastening position, and the sacrificial plate is connected to the load bearing body parts at a second fastening position, the first fastening position being arranged behind the second fastening position along the longitudinal direction.

2. The subframe arrangement as claimed in claim 1, wherein the sacrificial plate defines a weakened portion relative to longitudinal forces acting in the longitudinal direction.

3. The subframe arrangement as claimed in claim 2, wherein the weakened portion of the sacrificial plate defines at least one bore such that the fastener connected to the sacrificial plate are pulled out to the rear away from the sacrificial plate.

4. The subframe arrangement as claimed in claim 1, wherein the sacrificial plate is produced from a material defining a lower strength than a material of the load-bearing body parts.

5. The subframe arrangement as claimed in claim 1, wherein the load-bearing body parts are produced at least partially from a boron steel.

6. The subframe arrangement as claimed in claim 1, wherein the fastener is screw bolts screwed to weld nuts welded to the sacrificial plate.

* * * * *